(12) United States Patent
Matthies et al.

(10) Patent No.: US 7,967,301 B2
(45) Date of Patent: Jun. 28, 2011

(54) LEVEL CONTROL SYSTEM AND METHOD FOR CONTROLLING OR REGULATING A LEVEL CONTROL SYSTEM

(75) Inventors: Thomas Matthies, Hanover (DE); Harald Schaumburg, Sarstedt (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 12/916,771

(22) Filed: Nov. 1, 2010

(65) Prior Publication Data

US 2011/0049819 A1 Mar. 3, 2011

Related U.S. Application Data

(63) Continuation of application No. PCT/EP2009/053282, filed on Mar. 20, 2009.

(30) Foreign Application Priority Data

Apr. 30, 2008 (DE) .......................... 10 2008 021 818

(51) Int. Cl.
*B60G 17/00* (2006.01)
(52) U.S. Cl. .................................. 280/6.157
(58) Field of Classification Search ............... 280/6.157, 280/6.154, 6.155, 6.159, 5.506, 5.507, 5.508, 280/5.509
See application file for complete search history.

(56) References Cited

U.S. PATENT DOCUMENTS

| 6,523,845 | B2 * | 2/2003 | Stiller | 280/124.16 |
| 7,637,517 | B2 * | 12/2009 | Misawa | 280/124.16 |
| 2005/0012293 | A1 * | 1/2005 | Misawa | 280/124.157 |
| 2009/0079155 | A1 | 3/2009 | Rehra et al. | |

FOREIGN PATENT DOCUMENTS

| DE | 10 2004 057 575 A1 | 6/2006 |
| DE | 10 2005 030 726 A1 | 1/2007 |
| EP | 1 078 784 A2 | 2/2001 |

OTHER PUBLICATIONS

International Search Report of PCT/EP2009/053282, Dated Jun. 24, 2009.

\* cited by examiner

*Primary Examiner* — Faye M. Fleming
(74) *Attorney, Agent, or Firm* — Laurence A. Greenberg; Werner H. Stemer; Ralph E. Locher

(57) ABSTRACT

A method for controlling or regulating a level control system for a motor vehicle including a compressed air source, at least one air spring, a switchable directional control valve associated with the air spring and a master line connecting the compressed air source to the switchable directional control valve. The switchable directional control valve blocking the master line in a normal state thereof and connecting the master line through for filling the air spring in a switching state thereof. The master line is filled with compressed air before filling the air spring until the air pressure in the master line is at least equally as high as a predetermined threshold value, and only thereafter is the switchable directional control valve transferred into the switching state for filling the air spring. A level control system for a motor vehicle is also provided.

10 Claims, 2 Drawing Sheets

US 7,967,301 B2

LEVEL CONTROL SYSTEM AND METHOD FOR CONTROLLING OR REGULATING A LEVEL CONTROL SYSTEM

CROSS-REFERENCE TO RELATED APPLICATION

This is a continuation, under 35 U.S.C. §120, of copending International Application No. PCT/EP2009/053282, filed Mar. 20, 2009, which designated the United States; this application also claims the priority, under 35 U.S.C. §119, of German Patent Application DE 10 2008 021 818.9, filed Apr. 30, 2008; the prior applications are herewith incorporated by reference in their entirety.

BACKGROUND OF THE INVENTION

Field of the Invention

The invention relates to a method for controlling or regulating a level control system for a motor vehicle, including the following components:
a compressed air source,
at least one air spring,
a switchable directional control valve associated with the air spring, and
a master line connecting the compressed air source with the switchable directional control valve. The switchable directional control valve blocks the master line in its normal state and connects the master line through to fill the air spring in its switching state. The invention also relates to a level control system for a motor vehicle.

Modern motor vehicles are often equipped with a level control system. Such a level control system makes it possible to keep the level of the motor vehicle constant irrespective of the load status thereof. If the vehicle body of the motor vehicle drops below a predetermined level, the air springs of the level control system are filled with compressed air with the assistance of the compressed air source until the vehicle body is back to the predetermined level. At the beginning of such a control process, compressed air may initially escape from the air springs into the level control system, which may result in the vehicle body sagging. Sagging may be particularly severe if an air drier is located between the air springs and the compressed air source, since the air drier may take up a particularly large volume of air. It is known from the prior art to place a non-return valve between the air springs and the air drier or the compressed air source. The non-return valve opens in the direction of the air springs. The non-return valve prevents compressed air from escaping from the air springs into the air drier or into the compressed air source during the process of filling the air springs. The vehicle body is thus prevented from sagging. However it should be noted that the non-return valve acts like a resistor, which hinders the delivery of air from the compressed air source to the air springs and delays raising of the vehicle body during a filling process.

SUMMARY OF THE INVENTION

It is accordingly an object of the invention to provide a level control system and a method for controlling or regulating a level control system, which overcome the hereinafore-mentioned disadvantages of the heretofore-known systems and methods of this general type and with which sagging of a vehicle body during filling of an air spring of the level control system may be straightforwardly prevented.

With the foregoing and other objects in view there is provided, in accordance with the invention, a method for controlling or regulating a level control system for a motor vehicle. The method comprises providing a compressed air source, providing at least one air spring, providing a switchable directional control valve associated with the at least one air spring, connecting the compressed air source to the switchable directional control valve with a master line, blocking the master line in a normal state of the switchable directional control valve and connecting the master line through to fill the at least one air spring in a switching state of the switchable directional control valve. The master line is filled with compressed air until an air pressure in the master line is at least equal to a predetermined threshold value, before filling the at least one air spring. The switchable directional control valve is then transferred into its switching state for filling the at least one air spring.

Either a compressor or a compressed air accumulator may be used as the compressed air source for filling the air spring. The threshold value is fixed in such a way that, when the master line is switched through after filling it with compressed air, little or no compressed air escapes from the air spring and the vehicle body of the vehicle in which the level control system is installed does not drop or only drops slightly.

The advantage achieved with the invention is in particular that, during filling of an air spring, initial emptying of the air spring and thus sagging of the vehicle body in the region of the air spring is largely prevented. Sagging is completely prevented if the threshold value is selected in such a way that it is greater than the air pressure prevailing in the air spring to be filled. A further advantage of the invention is that the running time of a compressor during filling of the air spring is reduced, since no air which has escaped from the air spring has to be pumped back by the compressor and thus the temperature increase in the compressor may be reduced. A further advantage of the invention is that it is possible, in the level control system, to dispense with a non-return valve disposed between the air springs and the air drier or between the air springs and the compressed air source.

In accordance with another mode of the invention, the level control system includes a pressure sensor with which the pressure in the master line is measured prior to filling an air spring. The advantage of this further development is that the pressure difference between the threshold value and the pressure in the master line may be precisely determined. It is then possible to determine how much the air pressure in the master line has to be increased, with the assistance of the pressure difference.

In accordance with a further mode of the invention, the pressure in the master line is measured continuously and the switchable directional control valve is transferred into the switching state when the pressure in the master line is at least equal to the threshold value. Preferably, the switchable directional control valve is transferred into the switching state when the pressure in the master line is exactly the same as the threshold value. The advantage of this further development is that, by continuous measurement of the pressure in the master line, the air pressure prevailing therein may be precisely determined and thus only minimum filling of the master line with compressed air is necessary prior to filling of the air spring. Filling of the air spring is thus only minimally delayed.

In accordance with an added mode of the invention:
the pressure in the master line is measured once and, from the difference between the threshold value and the measured air pressure in the master line, a period of time is determined over which the master line must be filled with compressed air, so that the air pressure therein is at least equal to the threshold value, and the master line is filled with compressed air over the determined time period.

The advantage of this further development may be understood if the following is taken into account: It is possible to use a compressed air source with which particularly high pressures may be built up, e.g. a compressed air accumulator. In the master line, a pressure drop is present between the compressed air source and the switchable directional control valve, if compressed air flows through the master line from the compressed air source towards the switchable directional control valve. This pressure gradient becomes greater, as the pressure generated by the compressed air source becomes greater. In the case of a large air flow in the master line, the precise air pressure thus cannot be measured therein through the use of a pressure sensor. The advantage achieved with the further development is thus that, prior to filling, only the static air pressure in the master line (i.e. there is no air flow in the master line) needs be measured. This is also precisely possible when a compressed air source is used which generates a high air pressure.

In accordance with an additional mode of the invention:

prior to filling of the air spring, the master line is vented to the atmosphere, a period of time is determined from the difference between the threshold value and the atmospheric air pressure over which the master line must be filled with compressed air, so that the air pressure therein is at least equal to the threshold value, and the master line is filled with compressed air over the determined time period.

The advantage of this further development is that no pressure sensor is needed for determining the air pressure in the master line and the above-mentioned pressure difference may nevertheless be simply and precisely determined. A further advantage of the invention is that the period of time which is needed to fill the master line may be precisely determined from the above-mentioned pressure difference. Thus, the actual process of filling the air spring is delayed no longer than necessary.

In accordance with yet another mode of the invention, air pressure which prevails in the air spring at a specific loading and at a specific level of the vehicle body is fixed as the threshold value. The specific loading which may be selected is, for example, an average loading of the motor vehicle in which the level control system is installed (such an average loading, for which the systems in a motor vehicle are constructed, is predetermined by the motor vehicle manufacturers). The level which may be selected is, for example, a level which lies between the normal level of the vehicle body and the maximum level of the vehicle body. The advantage of this further development is that the threshold value may be fixed at the point of manufacture of the vehicle in which the level control system is installed.

In accordance with yet a further mode of the invention, the maximum air pressure in the air spring is preset as the threshold value. The maximum air pressure in the air spring prevails when the vehicle in which the level control system is installed is loaded to the admissible gross weight and the vehicle body is at the maximum level. The advantage of this further development is that the threshold value may be fixed at the point of manufacture of the vehicle in which the level control system is installed. A further advantage of the further development is that the actual air pressure in an air spring of the level control system is in most cases below the threshold value, and therefore in no event does the vehicle body drop upon filling of the air springs.

In accordance with yet an added mode of the invention, the air pressure in the air spring is determined and the air pressure determined in this way is fixed as the threshold value. The air pressure in the air spring may be indirectly determined in a simple manner, without the switchable directional control valve which is assigned to the air spring having to be opened. It is thus known, for example, to determine the air pressure in an air spring from the current level of the vehicle, the load status of the vehicle and the pressure-active cross-sectional area of the air spring. The advantage of the further development is that the pressure in the air spring is precisely determined before the filling process and thus the same air pressure or a greater air pressure than in the air spring may be established in the master line. Lowering of the vehicle body is therefore reliably prevented. At the same time it is ensured that filling of the master line does not take any more time than is necessary and the actual filling process is thus minimally delayed.

With the objects of the invention in view, there is concomitantly provided a level control system for a motor vehicle. The level control system comprises a compressed air source, at least one air spring, a master line connected to the compressed air source and a switchable directional control valve connected to the master line. The switchable directional control valve has a normal state and a switching state. The switchable directional control valve blocks the master line in the normal state and connects the master line through to fill the at least one air spring in the switching state. A control unit carries out the method according to the invention.

Other features which are considered as characteristic for the invention are set forth in the appended claims.

Although the invention is illustrated and described herein as embodied in a level control system and a method for controlling or regulating a level control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
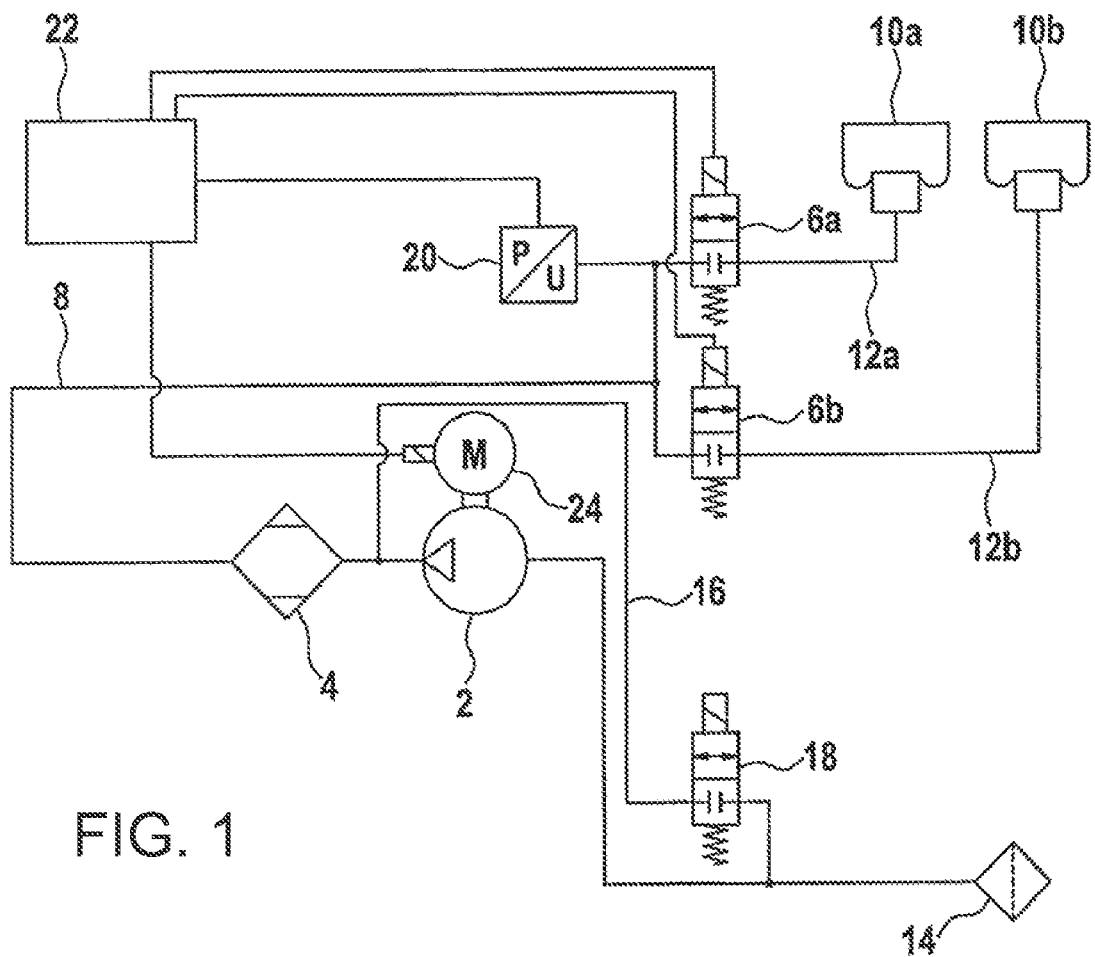
FIG. 1 is a schematic and block diagram of a first embodiment of a level control system.

Referring now to the figures of the drawings in detail and first, particularly, to FIG. 1 thereof, there is seen a schematic and block representation of a level control system for a motor vehicle, in which only those level control system components necessary for the following explanations are shown. The level control system includes a compressed air source in the form of a compressor 2, an air drier 4 and switchable directional control valves 6a, 6b. In addition, the level control system includes a master or main line 8, in which the air drier 4 is located and which is connected on one hand to an outlet of the compressor 2 and on the other hand to the switchable directional control valves 6a and 6b. In addition, the level control system includes air or pneumatic springs 10a, 10b, which are connected to the switchable directional control valves 6a, 6b by way of compressed air lines 12a, 12b. With the assistance of the compressor 2, compressed air may be transferred from the atmosphere 14 through the air drier 4 into the air springs 10a, 10b, in order to fill the air springs 10a, 10b and raise a non-illustrated vehicle body of a motor vehicle. In that case, the switchable directional control valves 6a, 6b are connected through from the air drier to the air springs. Compressed air may be let out from the air springs 10a, 10b into the atmosphere 14 in a manner which is known per se through the air drier 4 and a compressed air line 16, which is then connected through with the assistance of a switchable directional control valve 18. In addition to the above-stated components, the level control system includes a pressure sensor 20 and a control unit 22, with which the switchable directional control valves 6a, 6b, 18 and a motor 24 of the compressor 2 may be actuated.

The procedure to be carried out in the level control system before filling of an air spring, for example the air spring 10a, is explained below with reference to FIG. 1. In this case the switchable directional control valves 6a, 6b and 18 initially adopt the normal state shown in FIG. 1. First of all, with the assistance of the pressure sensor 20, the air pressure in the master line 8 is measured and the measurement result is forwarded to the control unit 22. During measurement, the switchable directional control valves 6a, 6b and 18 are in the state shown in FIG. 1. Once the air pressure in the master line 8 has been measured, the motor 24 of the compressor 2 is actuated by the control unit 22, in such a way that the compressor begins to run. The master line 8 is then filled with compressed air. Filling of the master line 8 with compressed air proceeds until the air pressure in the master line 8 is at least equal to a preset threshold value, which is saved in the control unit 22. During filling of the master line, the switchable directional control valves 6a, 6b and 18 are likewise in the state shown in FIG. 1.

The control unit 22 actuates the switchable directional control valve 6a if the control unit ascertains that the air pressure in the master line 8 is at least equal to the preset threshold value. The switchable directional control valve 6a then changes from the normal state shown in FIG. 1 into its switching state, in such a way that the master line 8 is then connected with the compressed air line 12a. With the assistance of the compressor 2, compressed air is then transferred into the air spring 10a until the non-illustrated vehicle body reaches the desired level. As soon as this is the case, the motor 24 and the switchable directional control valve 6a are no longer actuated by the control unit 22. As a consequence, the compressor 2 stops delivering compressed air and the switchable directional control valve changes from its switching state back to the normal state shown in FIG. 1. The master line 8 and the compressed air line 12a are then isolated from one another again.

The period of time over which the master line 8 has to be filled with compressed air so that at least the predetermined threshold value is reached may be fixed in various ways. A first option is for the pressure in the master line 8 to be measured continuously with the assistance of the pressure sensor 20 and for the result of the pressure measurement to be forwarded continuously to the control unit 22. The control unit 22 then constantly compares the air pressure 8 measured in the master line with the predetermined threshold value saved in the control unit 22. As soon as the air pressure measured in the master line 8 is exactly the same as or greater than the predetermined threshold value, the switchable directional control valve 6a is actuated by the control unit 22 and the air spring 10a is filled as explained above.

Another option resides in measuring the air pressure in the master line 8 a single time at the start of a filling process of the air spring 10a, with the assistance of the pressure sensor 20. The result of the measurement is then transmitted to the control unit 22 and the difference between the predetermined threshold value and the measured air pressure in the master line 8 is calculated in the control unit 22. On the basis of the pressure difference, a period of time is determined in the control unit 22 over which the master line has at least to be filled with compressed air in order for the air pressure therein to be at least equal to the predetermined threshold value. The period of time may be determined, for example, with the assistance of a performance map saved in the control unit 22, in which a time period is saved for every possible pressure difference between the predetermined threshold value and the air pressure measured in the master line 8. Once the period of time has been determined, the master line 8 is filled with compressed air over the determined period of time, with the switchable directional control valve 6a adopting the normal state shown in FIG. 1. Once the period of time has elapsed, the switchable directional control valve 6a is actuated by the control unit 22, in such a way that that valve changes from the normal state to the switching state. The air spring 10a is then filled as explained, with the assistance of the compressor 2.

If both air springs 10a and 10b are to be filled simultaneously, the procedure is in principle exactly as explained above. The only difference is that to fill the air springs 10a and 10b both the switchable directional control valve 6a and the switchable directional control valve 6b are actuated by the control unit 22, in such a way that both switchable directional control valves 6a, 6b change from the normal state shown in FIG. 1 to their switching state. The two air springs 10a and 10b are then filled in a manner which is known per se until the non-illustrated vehicle body displays the desired level.

Figure 2:
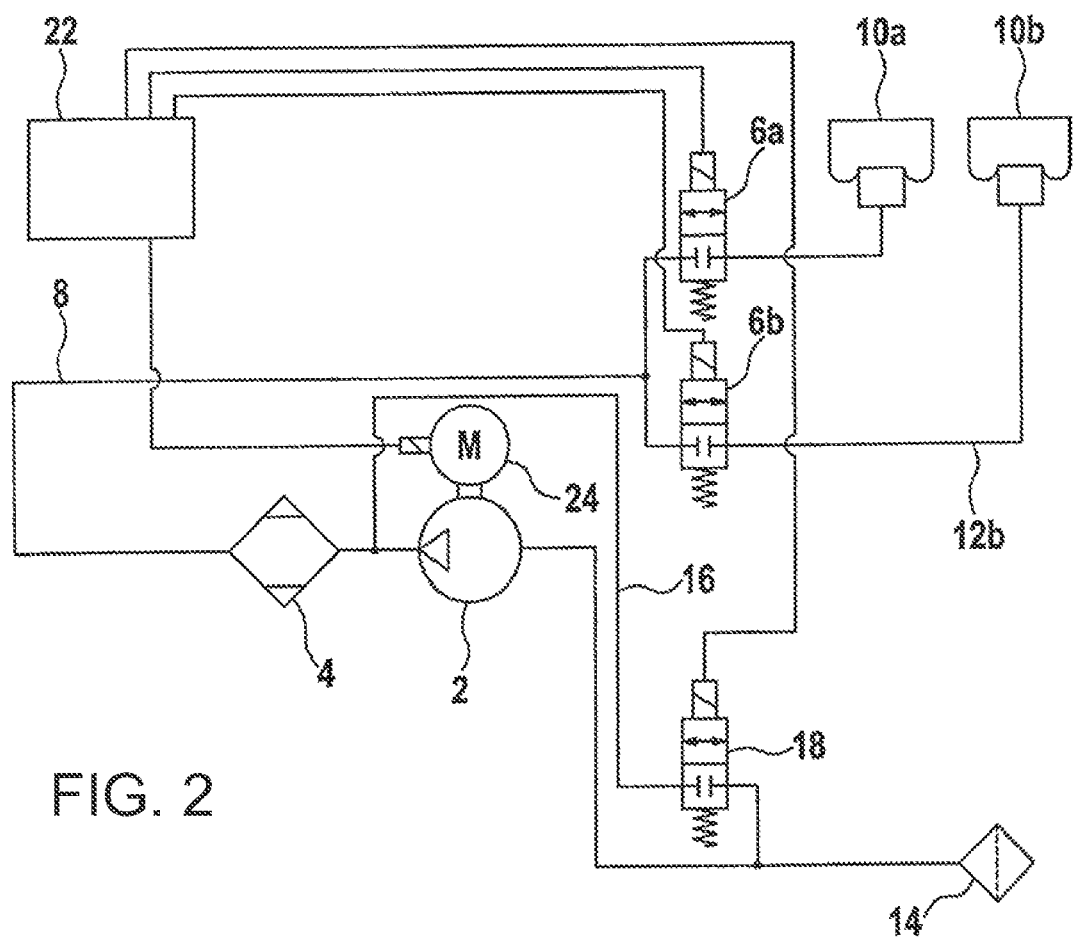
FIG. 2 is a schematic and block diagram of a second embodiment of a level control system.

FIG. 2 is a schematic and block representation of a level control system which is of largely identical construction to the level control system shown in FIG. 1. The only difference is that the level control system shown in FIG. 2 does not contain a pressure sensor. The way in which the air springs of the level control system are filled with compressed air, is explained below with reference to the air spring 10a. The switchable directional control valves 6a, 6b and 18 in this case initially adopt the normal state shown in FIG. 2. Prior to filling of the air spring 6a, the master line 8 is vented to the atmosphere. To this end, the switchable directional control valve 18 is actuated by the control unit 22, in such a way that that valve changes from the normal state shown in FIG. 2 to its switching state. The master line 8 is then connected to the atmosphere 14 through the compressed air line 16 and is vented thereto. After venting, atmospheric air pressure prevails in the master line 8 and the switchable directional control valve 18 is no longer actuated by the control unit 22, in such a way that it changes back to the normal state shown in FIG. 2. A differential pressure is then determined in the control unit 22 from the threshold value prevailing there and the atmospheric air pressure. Through the use of the pressure difference, a period of time is determined in the control unit 22 over which the master line has at least to be filled with compressed air in order for the air pressure in the master line 8 to be at least equal to the predetermined threshold value. This may, for example, take place with the assistance of a performance map saved in the control unit, as has already been explained in connection with FIG. 1.

After determining the period of time, the motor 24 is actuated by the control unit 22, in such a way that the compressor 2 delivers compressed air into the master line 8. Once the period of time has elapsed, the switchable directional control valve 6a is actuated by the control unit 22, in such a way that that valve changes from the normal state shown in FIG. 2 to the switching state. The air spring 10a is then filled as has already been explained in connection with FIG. 1.

The threshold value may be differently fixed and saved in the control unit 22 of the level control system, both in the exemplary embodiment according to FIG. 1 and in the exemplary embodiment according to FIG. 2. A first option is to preset and fix the threshold value in the control unit 22 in such a way that the vehicle body of the motor vehicle in most cases does not drop or drops only slightly if a switchable directional control valve 6a, 6b is transferred from the normal state shown in FIGS. 1 and 2 into its switching state. The threshold value may take the form of an air pressure fixed at the point of manufacture of the vehicle in which the level control system is installed, with that air pressure prevailing in the air springs 10a, 10b upon average loading and with an average level. Average loading may be regarded as, for example, loading with 2 people and luggage and a full tank of fuel. An average level may, for example, be deemed to be a level which is between a predetermined normal level of the vehicle and a maximum level to which the vehicle body may be maximally raised through the use of air springs.

A further option for fixing the threshold value resides in fixing the maximum air pressure which may maximally prevail in the air springs 10a, 10b, as the threshold value in the control unit 22. This maximum air pressure prevails when the vehicle body of the motor vehicle is at the highest possible level with maximum admissible loading of the motor vehicle.

A further option for fixing the threshold value finally resides in determining the current air pressure in the air spring 10a or 10b before filling of the corresponding air spring and presetting the thus determined air pressure in the control unit 22 as the threshold value for the upcoming filling process. Determination of the air pressure may take place in a manner which is known per se indirectly in the control unit 22 through the use of the loading state, the vehicle level and the pressure-active area of the air spring 10a, 10b. If a plurality of air springs of the level control system have to be simultaneously filled with compressed air, the greatest of all the air pressures currently prevailing in the air springs is taken into account in the control unit 22 as the threshold value for the current filling process.

The invention claimed is:

1. A method for controlling or regulating a level control system for a motor vehicle, the method comprising the following steps:
   providing a compressed air source;
   providing at least one air spring;
   providing a switchable directional control valve associated with the at least one air spring;
   connecting the compressed air source to the switchable directional control valve with a master line;
   blocking the master line in a normal state of the switchable directional control valve and connecting the master line through to fill the at least one air spring in a switching state of the switchable directional control valve;
   filling the master line with compressed air until an air pressure in the master line is at least equal to a predetermined threshold value, before filling the at least one air spring; and
   then transferring the switchable directional control valve into its switching state for filling the at least one air spring.

2. The method according to claim 1, which further comprises measuring the pressure in the master line with a pressure sensor, prior to the step of filling the at least one air spring.

3. The method according to claim 2, which further comprises:
   carrying out the step of measuring the pressure in the master line continuously; and
   carrying out the step of transferring the switchable directional control valve into the switching state when the pressure in the master line is at least equal to the threshold value.

4. The method according to claim 2, which further comprises:
   carrying out the step of measuring the pressure in the master line once;
   determining, from a difference between the threshold value and the measured air pressure in the master line, a period of time over which the master line must be filled with compressed air, so that the air pressure therein is at least equal to the threshold value; and
   carrying out the step of filling the master line with compressed air over the determined time period.

5. The method according to claim 1, which further comprises:
   venting the master line to the atmosphere prior to the step of filling the at least one air spring;
   determining, from a difference between the threshold value and the atmospheric air pressure, a period of time over which the master line must be filled with compressed air, so that the air pressure therein is at least equal to the threshold value; and
   carrying out the step of filling the master line with compressed air over the determined time period.

6. The method according to claim 1, which further comprises fixing the threshold value as an air pressure prevailing in the at least one air spring at a specific loading and at a specific level of a vehicle body.

7. The method according to claim 1, which further comprises presetting the threshold value as a maximum air pressure in the at least one air spring.

8. The method according to claim 1, which further comprises determining an air pressure in the at least one air spring and fixing the determined air pressure as the threshold value.

9. A level control system for a motor vehicle, the level control system comprising:
   a compressed air source;
   at least one air spring;
   a master line connected to said compressed air source;
   a switchable directional control valve connected to said master line, said switchable directional control valve having a normal state and a switching state, said switchable directional control valve blocking said master line in said normal state and connecting said master line through to fill said at least one air spring in said switching state; and
   a control unit for carrying out the method according to claim 1.

10. A level control system for a motor vehicle, the level control system comprising:
   a compressed air source;
   at least one air spring;
   a master line connected to said compressed air source;
   a switchable directional control valve connected to said master line, said switchable directional control valve having a normal state and a switching state, said switchable directional control valve blocking said master line in said normal state and connecting said master line through to fill said at least one air spring in said switching state; and a control unit programmed to:
  fill said master line with compressed air until an air pressure in said master line is at least equal to a predetermined threshold value, before filling said at least one air spring; and
  then transfer said switchable directional control valve into its switching state for filling said at least one air spring.

* * * * *